United States Patent
Scharnitzky

(10) Patent No.: US 9,581,477 B2
(45) Date of Patent: Feb. 28, 2017

(54) MEASURING HEAD CLAMP-ON DEVICE FOR ULTRASONIC FLOW-MEASURING HEADS

(71) Applicant: FLEXIM Flexible Industriemesstechnik GmbH, Berlin (DE)

(72) Inventor: Jan Frederik Scharnitzky, Berlin (DE)

(73) Assignee: FLEXIM FLEXIBLE INDUSTRIEMESSTECHNIK GmbH, Berlin (DE)

( * ) Notice: Subject to any disclaimer, the term of this patent is extended or adjusted under 35 U.S.C. 154(b) by 0 days.

(21) Appl. No.: 14/796,226

(22) Filed: Jul. 10, 2015

(65) Prior Publication Data

US 2016/0011026 A1    Jan. 14, 2016

(30) Foreign Application Priority Data

Jul. 11, 2014   (DE) .................. 10 2014 109 772

(51) Int. Cl.
| | |
|---|---|
| *F16M 13/00* | (2006.01) |
| *G01F 1/66* | (2006.01) |
| *G01F 15/18* | (2006.01) |
| *F16B 2/08* | (2006.01) |

(52) U.S. Cl.
CPC ............... *G01F 1/662* (2013.01); *F16B 2/08* (2013.01); *G01F 15/18* (2013.01)

(58) Field of Classification Search
CPC .......... G01F 11/662; G01F 1/66; G01F 15/18; G01F 5/00; G01F 1/662; G01F 15/00; F16B 2/08; F16B 31/02; F16L 33/10; F16L 3/137; F16L 3/233; Y10T 24/1439; G01N 29/223; G01N 2203/0676; G01N 2291/0226; G01N 2291/02836; G01N 2291/2634; B23K 37/02
USPC .................. 73/49.8, 861.18, 861.28, 861.27; 248/74.3; 24/278
See application file for complete search history.

(56) References Cited

U.S. PATENT DOCUMENTS 1,553,891 A * 9/1925 Cloud ....................... B25B 5/10
138/99
4,019,373 A * 4/1977 Freeman ................. G01F 1/662
73/597

(Continued)

FOREIGN PATENT DOCUMENTS

DE    10 2004 052 489    5/2006
DE    10 2005 052 550    2/2007

(Continued)

*Primary Examiner* — Christopher E Garft
(74) *Attorney, Agent, or Firm* — Muncy, Geissler, Olds & Lowe, P.C.

(57) ABSTRACT

A measuring head clamp-on device for ultrasonic flow measuring heads includes a guide element for receiving at least one measuring head protective housing for at least one measuring head and includes at least one clamping unit connected to the guide element, and thereto connected clamping device for detachably fastening the guide element to the measuring tube, wherein the guide element is non-positively or positively connected to at least one apparatus for centering and clamping the same on the measuring tube, so that the guide element is oriented and fastened parallel and with a defined distance to the apex of the measuring tube irrespective of the tube diameter.

6 Claims, 4 Drawing Sheets

(56) References Cited

U.S. PATENT DOCUMENTS

| | | | | |
|---|---|---|---|---|
| 4,286,470 A * | 9/1981 | Lynnworth | G01F 1/662 | 73/637 |
| 4,569,497 A * | 2/1986 | Elmer | F16B 2/08 | 248/180.1 |
| 4,761,024 A * | 8/1988 | Ewen | B29C 65/7802 | 137/318 |
| 5,001,396 A | 3/1991 | Snellgrove et al. | | |
| 5,001,936 A * | 3/1991 | Baumoel | G01F 1/662 | 73/861.18 |
| 5,131,278 A * | 7/1992 | Baumoel | G01F 1/662 | 73/861.18 |
| 5,344,108 A * | 9/1994 | Heath | F16L 3/14 | 248/300 |
| 5,410,920 A * | 5/1995 | Westwick | F16L 41/04 | 73/863.85 |
| 6,397,683 B1 * | 6/2002 | Hagenmeyer | G01F 1/662 | 73/861.18 |
| 7,520,477 B2 * | 4/2009 | Noseworthy | H02G 3/105 | 248/230.8 |
| 7,669,483 B1 * | 3/2010 | Feller | G01F 1/662 | 24/279 |
| 8,104,359 B2 | 1/2012 | Wiest et al. | | |
| 2004/0173029 A1 * | 9/2004 | Osone | G01F 1/662 | 73/861.25 |
| 2005/0193839 A1 * | 9/2005 | Gronvall | G01D 11/245 | 73/866.5 |
| 2006/0090570 A1 * | 5/2006 | Wiest | G01F 1/662 | 73/824 |
| 2007/0107533 A1 * | 5/2007 | Molenaar | G01F 1/662 | 73/856 |
| 2007/0137312 A1 * | 6/2007 | Panicke | G01F 1/662 | 73/861.28 |
| 2007/0151364 A1 * | 7/2007 | Wiest | G01F 1/663 | 73/861.27 |
| 2007/0232919 A1 * | 10/2007 | Pors | A61B 8/4209 | 600/454 |
| 2007/0251314 A1 * | 11/2007 | Molenaar | G01F 1/662 | 73/201 |
| 2008/0022776 A1 * | 1/2008 | Buchanan | G01F 1/662 | 73/632 |
| 2011/0094309 A1 | 4/2011 | Berger et al. | | |
| 2011/0120231 A1 * | 5/2011 | Berger | G01F 1/662 | 73/861.18 |
| 2011/0174083 A1 * | 7/2011 | Berger | G01F 15/18 | 73/861.27 |
| 2012/0085164 A1 * | 4/2012 | Roehrig | G01F 1/662 | 73/273 |
| 2014/0000339 A1 | 1/2014 | Funck | | |
| 2015/0107371 A1 * | 4/2015 | Khrakovsky | G01F 1/66 | 73/861.28 |
| 2016/0011026 A1 * | 1/2016 | Scharnitzky | G01F 15/18 | 248/542 |

FOREIGN PATENT DOCUMENTS

| | | |
|---|---|---|
| DE | 10 2005 047 790 | 4/2007 |
| DE | 10 2008 029 772 | 12/2009 |
| DE | 10 2008 034 411 | 1/2010 |
| DE | 10 2011 005 170 | 9/2012 |
| EP | 1 840 528 | 3/2012 |
| WO | WO-98/17980 | 4/1998 |

\* cited by examiner

MEASURING HEAD CLAMP-ON DEVICE FOR ULTRASONIC FLOW-MEASURING HEADS

BACKGROUND OF THE INVENTION

The inventive solution for a measuring head clamp-on device for ultrasonic flow-measuring heads lies within the technical field of ultrasonic flow measuring technology.

A pair of ultrasonic measuring heads is placed onto the outside of a tubing. By means of a measuring transducer, an ultrasonic pulse is generated alternately in both measuring heads and, after having passed through the tube wall and the medium in the tube, is received by the respectively other measuring head. Via the measured transit time difference (with or counter to the flow of the medium), the tube parameters and the flow profile, the flow quantity is calculated in the measuring transducer.

A precondition for these measurements is a secure transmission of the ultrasonic pulses from the measuring head into the tube wall. This is achieved by a suitable coupling means, the aligned orientation of the measuring heads, along the tube axis relative to one another, and by the contact pressing of the measuring heads onto the tube wall. The orientation of the measuring heads and the contact pressing are the functions of a measuring head clamp-on device.

The ultrasonic measuring heads are currently generally fitted by means of rail-like fastening systems, these being fastened to the tube with metallic band clamps or chains.

In addition to the rail-like systems for receiving one or more measuring head pairs, there are also fastening systems having receiving fixtures for receiving a single measuring head. The measuring heads are positioned by the fastening systems, and in most cases the measuring heads are pressed by means of spring elements elastically against the tube wall.

For instance, measuring head fastenings for ultrasonic flow meters, which fastenings guarantee a defined contact pressing force, are known. The measuring head fastenings are designed for fixed installation and offer a continuous, constant contact pressing of the measuring heads onto the tube.

In clamp-on flow measurement, the two sound transducers which are necessary to produce a sound path are arranged on the tube such that the sound path runs on the diameter of the tube. To this end, the sound transducers can be arranged on opposite sides of the tube. This is then the so-called direct arrangement (DE 102011005170 B4, DE 102005047790 A1). Alternatively, the reflex arrangement is possible, in which the sound transducers are arranged on the same side of the measuring tube and the sound signal is reflected once on the opposite inner side of the tube (DE 102008029772 A1).

In DE 102008034411 A1, a method and a measuring system for determining and/or monitoring the flow of a measuring medium through a measuring tube, comprising at least two ultrasonic measuring heads, is described. In addition, a method for fitting such a measuring system is disclosed. To this end, the measuring system has a measuring head holder, which can be detachably fastened to the measuring tube via a fastening mechanism. The measuring head housing with the ultrasonic measuring heads forms a unit fastenable to the sensor holder and detachable from the sensor holder. In the course of the assembly, the ultrasonic measuring heads are pressed with a predefinable force onto the measuring tube. A fastening plate, as part of the sensor holder, has on the side facing towards the measuring tube a prismatic bulge, which can be created as a bend in the fastening plate. The fastening plate is fastened at its front and rear end directly to the measuring tube, by means of U-bolts or band clamps.

In Patent Specification U.S. Pat. No. 5,131,278 A, the sensor holder is fastened by means of band clamps on the measuring tube by means of nuts and bolts.

In U.S. Pat. No. 6,397,683 B1, the measuring sensors are fastened on a rail and, with the aid of two tube clips, on the measuring tube. In order to adjust the distance between the two sensors, at least one sensor can be released from the tubing. Likewise, its fixing strap can be released. Both can be refixed after a reorientation.

EP 1840528 B1 discloses a rail for the displaceable fastening of ultrasonic measuring heads on the measuring tube.

In DE 102005052550 B3, a fastening device for fastening a holding device, for holding the measuring transducer, to the support is disclosed. The fastening device consists of a ratchet device and a main body, which latter is fastened with a knurled nut on the ratchet device. A centering apparatus consists of a groove into which a boss can be guided in order to be able to orient a guide frame securely in the longitudinal direction relative to the tube.

In the same way, U.S. Pat. No. 5,001,936 A shows that the mounting is provided with two legs, which do not readily allow adaptation to all possible tube diameters. In US 20120085164 A1 is represented a view from which it is evident that the smaller is the tube diameter, the more tightly will the measuring head rest on the tube. The guide element cannot be variably oriented.

In DE 102004052489 A1 is disclosed an apparatus which enables the sensor to be pressed directly against the tubing. For this, a coupling mat made of an elastomer or a metal foil is provided between the sensor and the tubing. The design serves to enable an increased contact pressure of the sensor.

WO 1998017980 A1 shows the possibility of adapting the spacing of the measuring device in accordance with the curvature of the tube by the use of spacers. The spacers are provided with pins and can be inserted at different positions prior to the clamping device being fitted onto the tube. A certain adaptation to different tube diameters is thereby possible, though a stepless adaptation is not provided.

In particular, the measurement of gases places an increased requirement on a sufficiently large measuring head pressing, since in this case damping elements are fitted to the tube walls in order to minimize background noise in the tube wall. In order to achieve a sufficiently good signal coupling despite these damping elements, a sufficiently high contact pressure of the measuring heads against the tube is in this case particularly important.

Most existing solutions fail to meet the requirement for a defined contact pressing force which is achieved irrespective of the know-how and skill of the user. If the user, for instance, fastens the measuring head clamp-on device with too little contact pressing force, a poor to inadequate coupling of the measuring heads to the tube is realized and no good signal coupling results therefrom. Or the measuring head clamp-on device is fastened with a too high contact pressing force, resulting in a too great load for the components used.

SUMMARY OF THE INVENTION

The object of the invention consists in functionalizing the known measuring head fastenings for ultrasonic flow meters for the necessary functions as a portable clamp-on device to different diameters, such as large pipes or small tubes, and in simplifying the handling. This includes a toolless assembly with fewest possible actuating elements, the option to be able to choose two differently large contact pressing forces, the option to select a reusable clamping device which can be packed in a space-saving manner and at the same time has a high breaking load. It is further an object of the invention to enable the flow measuring heads to be fitted on the running plant without interruptions to the tubing and without leakage risks, combined with the operating reliability and robustness of a fixedly installed measuring device.

The portable measuring head clamp-on device is intended to ensure with just one actuating element the centering, clamping to the measuring tube and the defined contact pressing force. The difficulty in this is that, as a result of the centering of the measuring head clamp-on device on the tube, the distance between the tube apex and the reference point of the measuring head clamp-on device (for the reception of the spring element) varies in dependence on the tube diameter. Consequently, there must be a functional element which gets round this dependency.

The inventive measuring head clamp-on device for ultrasonic flow measuring heads, comprising a guide element for receiving at least one measuring head protective housing for at least one measuring head and comprising at least one clamping unit connected to the guide element, and thereto connected clamping device for detachably fastening the guide element to the measuring tube is provided, wherein the guide element is non-positively and/or positively connected to at least one apparatus for centering and clamping the same on the measuring tube, so that the guide element is oriented and fastened parallel and with a defined distance to the apex of the measuring tube irrespective of the tube diameter. According to the invention, the apparatus for centering and clamping the guide element consists of a centering element, a spacing element and a clamping unit, which are connected both to one another and to the guide element via a connecting element.

For one embodiment, the spacing element consists of two mutually parallel functional surfaces, which have a defined distance apart, wherein the first functional surface contains a free-moving pivot joint, which is arranged opposite the measuring tube and forms an interface for the reception of the connecting element, and the second functional surface rests on the measuring tube. The spacing element is directly connected to the guide element by a fixed, immovable connection.

In one embodiment, the centering element consists of a rectangularly shaped part and is provided at its free distal end with a free-moving pivot joint, which is arranged opposite the measuring tube and forms an interface for the reception of the connecting element. At its end facing towards the measuring tube, the centering element has in the middle a cutout, which serves as the functional surface in order to orient the guide element parallel to a straight surface line of the measuring tube on the tube surface. The cutout of the centering element, which cutout is symmetrical to the tube apex, has the shape of a dovetail. Other embodiments of the functional surface in the form of two spheres, two cylindrical bodies or a prismatic cutout are possible.

The centering element is disposed in a sliding mounting and is movable relative to the measuring tube solely in the radial direction.

The clamping unit consists of a cylindrical compression spring, a tension bolt, a tension element, a clamping screw, an abutment pin, a clamping device and the connecting element. The tension element is non-positively connected to the tension bolt and the clamping device is inserted into the tension element for the symmetrical clamping of the guide element. The connecting element is mounted in its center point in a pivot joint which is disposed on the tension bolt and which simultaneously serves to receive the abutment pin. The compression spring is arranged distally to the abutment pin and, on the one hand, presses against the clamping screw and, on the other hand, acts radially to the measuring tube upon the abutment pin, wherein the tension bolt is guided by the abutment pin.

The connecting element is configured as a rocker, which at its two ends rests on in each case a displaceable spherical bearing, which spherical bearings are realized as pivot joints of the spacing element and the guide element.

The measuring head protective housing is connected to an energy store, which for its part is operatively connected to the guide element.

The clamping unit is dimensioned for a fastening with a defined contact pressing force. A precondition for this is the presence of an interface with defined distance from the tube surface. Given a sufficiently good centering of the measuring head clamp-on device, the distance is achieved irrespective of the tube diameter.

The fundamental advantage of the invention consists in the fact that, through mounting of the measuring head clamp-on device according to the invention and tensioning of the chain with just one control element, the requirements are met in the simplest operating manner.

BRIEF DESCRIPTION OF THE DRAWINGS

The invention is more closely explained with reference to drawings, wherein.

DETAILED DESCRIPTION OF THE INVENTION

The ultrasonic flow measuring heads are fastened to the outside of tubings, so that the measuring heads can be positioned in mutual alignment, centrally to the tube axis and in a radially free arrangement. For this, a centering of the measuring head clamp-on device on the tube surface is necessary. The measuring head clamp-on device is designed such that two measuring heads can be received. It is sufficiently long to ensure displacement of the measuring heads relative to each other. Where two measuring head clamp-on devices are used and a measurement is made in the reflex mode (both measuring heads on the same tube side), any spacing of the measuring heads can be set. In the direct mode, both measuring heads must be fastened on the tube precisely opposite each other or with a minimal offset, so that also a negative measuring head spacing can be set. The fastening of the measuring head clamp-on device to the measuring tube is realized by a suitable clamping device, which is placed around the measuring tube. The clamping device is tensioned by an actuating element on the measuring head clamp-on device. The tensioning takes place centrically, that is to say the two ends of the clamping device are uniformly and simultaneously tensioned. The defined contact pressing forces are independent of the tube diameter. As a result of the apparatus according to the invention, the contact pressing forces are achieved securely and irrespective of the user (know-how). As a result of different coupling mediums for the measuring heads, differently high contact pressing forces of the measuring heads onto the tube wall are necessary. The measuring head clamp-on device is produced from chemically resistant materials.

Figure 1:
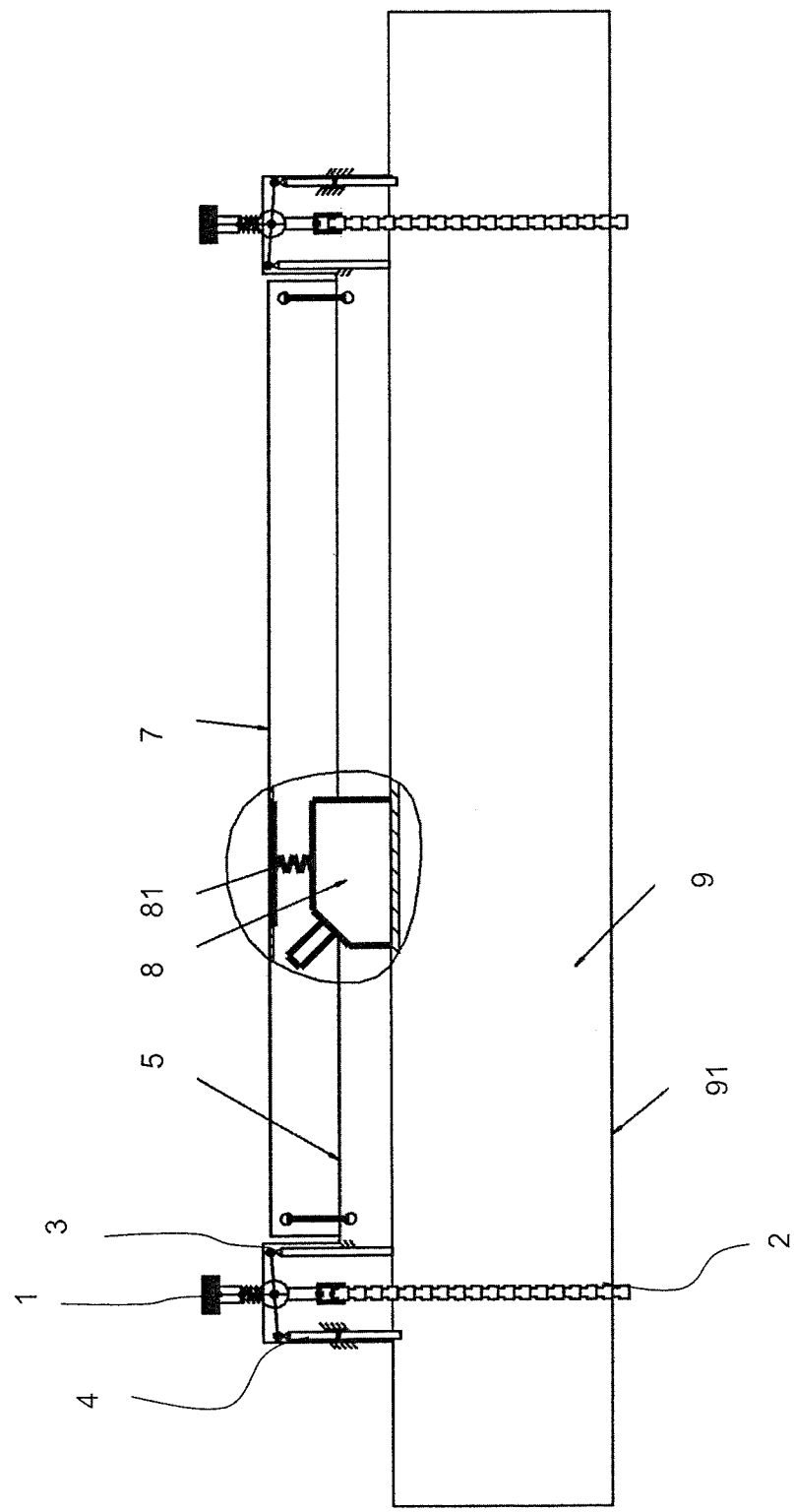
FIG. 1 shows a measuring tube with the measuring head clamp-on device according to the invention.

The basic structure of the portable measuring head clamp-on device according to the invention is composed of a guide element 5 and at least one measuring head protective housing 7, two clamping units 1 with clamping device 2, as well as two spacing elements 3 and two centering elements 4 (FIG. 1).

Guide Element

The guide element 5 is the central connecting link for all sub-function elements, which are at least non-positively and/or positively connected to one another via the guide element 5. The guide element 5 is an elongated housing and further serves to receive at least one measuring head protective housing 7. To this end, the guide element 5 is open toward the measuring tube 9. In the measuring head protective housing 7 is arranged at least one measuring head 8, which rests with its contact surface on the tube surface 91. Furthermore, the measuring head protective housing 7 is connected to an energy store 81 (for instance one or more springs), which for its part is connected to the measuring head 8. As a result of the energy store 81, the measuring head 8 present in the measuring head protective housing 7 is pressed with a defined, constant contact pressure force, and a defined travel, against the tube surface 91. In the guide element 5, the measuring head protective housing 7 is guided along the tube longitudinal axis.

For this illustrative embodiment, to the guide element 5 are respectively connected at both ends an apparatus for centering and clamping of the guide element 5. This apparatus is respectively composed of, arranged in the axial direction of the measuring tube 9 mirror-symmetrically at both ends, a centering element 4, a clamping unit 1 and a spacing element 3. The guide element 5 is oriented parallel and, as a result of the spacing element 3, at a defined distance to the apex of the tube surface 91 irrespective of the tube diameter, and fastened with the clamping unit 1. The connection to the spacing element 3 is fixed and immovable. Since, as a result of the spacing element 3, a defined distance to the apex of the tube surface 91 is achieved, the energy stores 81 (for instance springs) connected to the measuring head protective housing 7 are compressed constantly and, irrespective of the tube diameter, equally strongly. In the clamped state, the same force is applied by the guide element 5 to every point on the tube surface 91.

Figure 2:
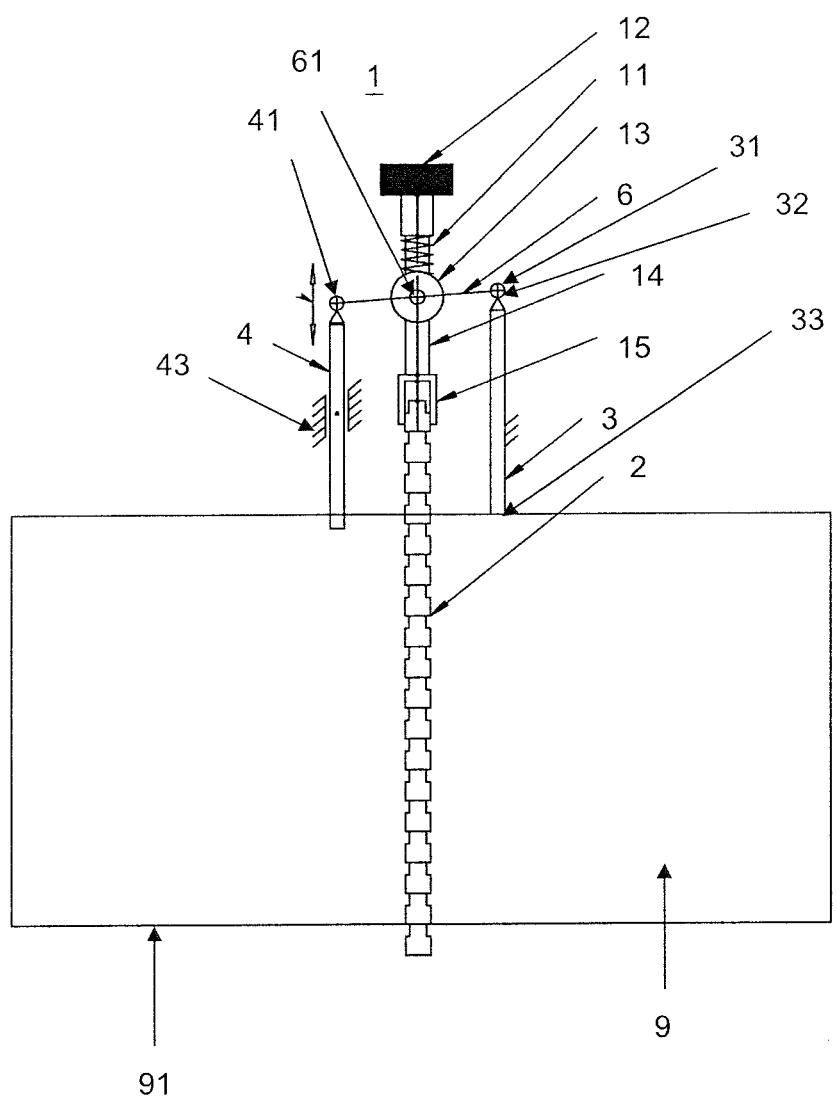
FIG. 2 shows a schematic representation of the functional elements of the measuring head clamp-on device according to FIG. 1.
Figure 3:
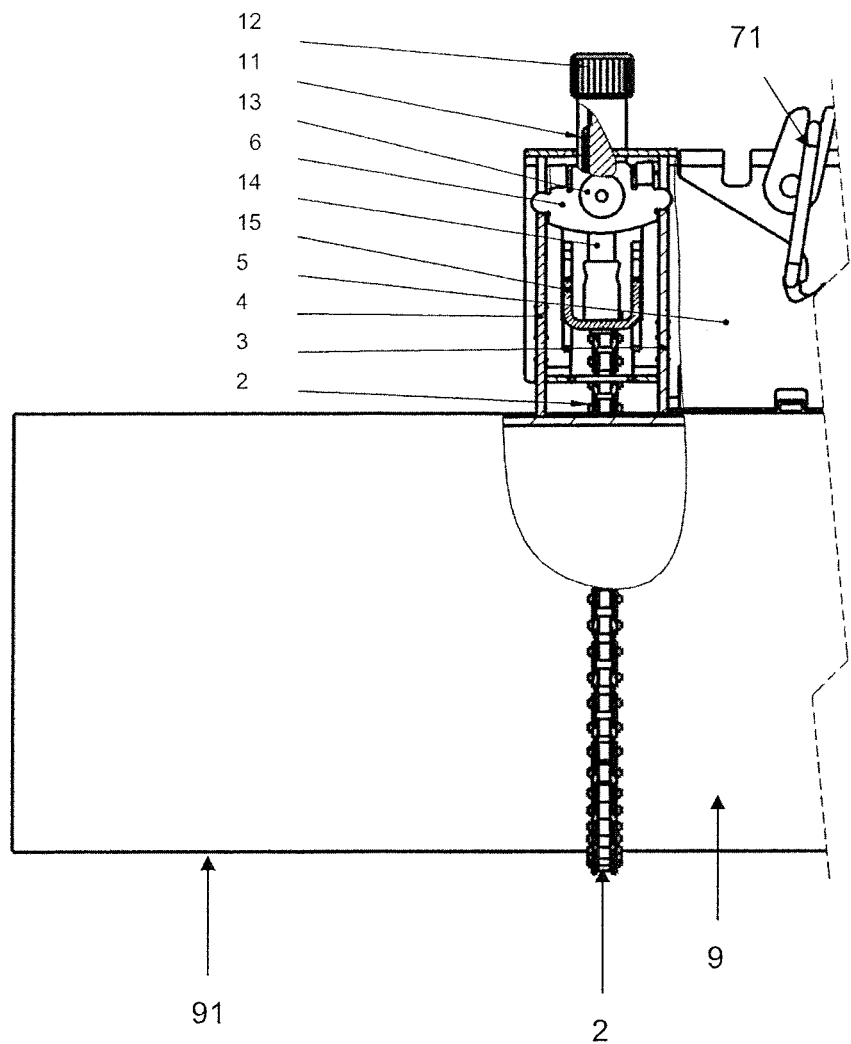
FIG. 3 shows an illustrative embodiment represented in a detail.

FIG. 2 shows a schematic representation of the functional elements of the measuring head clamp-on device according to FIG. 1, and FIG. 3 shows an illustrative embodiment which is represented in a detail and shall be explained below.

Spacing Element

A spacing element 3 is respectively disposed at both ends of the guide element 5 directly by a fixed, immovable connection, for example by welding or bolting. As a result of the spacing element 3, an always equal distance of the measuring head 8 to the tube surface 91 is enabled. The spacing element 3 has two mutually parallel functional surfaces 32 and 33 having a defined distance apart, wherein the first functional surface 32 contains a free-moving pivot joint 31 and the second functional surface 33 rests on the measuring tube 9. In a simple embodiment, the spacing element 3 is realized by a rectangularly shaped sheet-metal part. It can also be realized, for instance, as a rod. A pivot joint 31, which in the embodiment acts as a fixed pivot joint, forms an interface for the reception of a connecting element, for instance a rocker 6. As a result of its design, the spacing element 3 enables the defined contact pressing force of the measuring heads 8 and of the measuring head protective housing 7, respectively, on the measuring tube 9.

Centering Element

Figure 4:
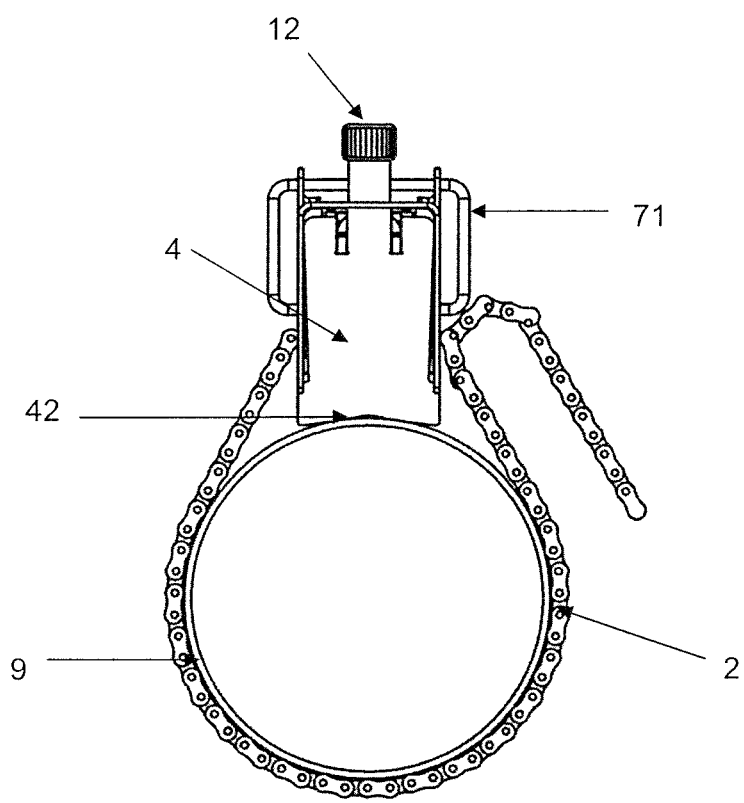
FIG. 4 shows a schematic representation of the centering element from the side.

At both ends of the guide element 5, distanced from the spacing element 3 outwardly in the axial direction of the measuring tube 9, is respectively arranged a centering element 4. The centering element 4 enables the aligned assembly of the total system relative to the tube longitudinal axis. The centering element 4 consists of a rectangularly shaped part, for instance a metal plate, with a pivot joint 41, which is disposed at that end of the centering element 4 which lies opposite the measuring tube 9. At its end facing towards the measuring tube 9, the centering element 4 has in the middle a cutout 42 symmetrical to the tube apex, in order to facilitate mounting onto small and large tubes 9. The distance between the points of contact of the cutout 42 with the measuring tube 9 should be smaller than the tube diameter. This condition can be met for different tube diameters with a single arrangement, so that one and the same arrangement can be used for different diameters of the measuring tube 9. In this context, FIG. 4 shows a schematic representation providing a view of the centering element 4. The cutout 42 has a dovetail shape, for instance, and serves as a functional surface in order to orient the guide element 5 parallel to a straight surface line of the tube 9 on the tube surface 91. Just as in the case of the spacing element 3, the pivot joint 41 is a free-moving joint on which the rocker 6 rests and is thus mounted in a freely rotable manner in these two points (pivot joints 31 and 41). As a result of the rocker 6 and a sliding mounting 43 of the centering element 4, which mounting is realized, for example, as a floating bearing, it is made possible for a deflection of the centering element 4, in the case of different tube diameters, to be compensated. The centering element 4 is connected to the guide element 5 such that the centering element 4 is movable relative to the measuring tube 9 solely in the radial direction.

Connecting Element

In the present illustrative embodiment, the connecting element is configured as a rocker 6 and, by virtue of its interfaces to the spacing element 3 and to the centering element 4, is the elementary component part of the design. The rocker 6 is an elongated unit, for instance in the form of a beam, which at its two ends rests loosely on the spacing element 3 and the centering element 4. The rocker 6 is connected to the total construction firstly by a displaceable spherical bearing for the centering element 4 and a further spherical bearing for the spacing element 3, which are realized as pivot bearings 41 and 31. Secondly, a connection exists to a spherical bearing which is realized as a pivot bearing 61 and serves to receive an abutment pin 13.

At one end, the rocker 6 is rotatably mounted on the pivot joint 31. As a result of the spacing element 3, the distance of this pivot point in relation to the tube apex is fixedly defined. The bearing 43 is located on the centering element 4, which is operatively connected to the opposite end of the rocker 6. The rocker 6 here rests on the centering element 4 in such a way that a displaceable spherical bearing (pivot bearing 41) is obtained. The rocker 6 possesses a borehole in which the abutment pin 13 is rotatably mounted. If the centering element 4 and the spacing element 3 rest on the tube surface 91, and if, as a result of the abutment pin 13, a radial force directed to the tube center point of the measuring tube 9 acts upon the rocker 6, a fixed and immovable connection of clamping unit 1 and measuring tube 9 is obtained. Since the clamping screw 12 uses the abutment pin 13 as a counter-bearing, the abutment pin 13, upon tensioning of the clamping device 2 by means of the clamping screw 12, is pulled in the direction of the measuring tube 9. As a result of this process, the two bearing points of the rocker (at the spacing element 3 and at the centering element 4) are pressed simultaneously against the measuring tube 9. Thus a fixed connection of measuring tube 9 and clamping unit 1 is obtained. Consequently, the rocker 6 and the abutment pin 13, in conjunction with the centering element 4, ensure, on the one hand, the centering of the measuring head clamp-on device on the measuring tube 9 and, on the other hand, in conjunction with the spacing element 3, the preconditions for achieving a defined contact pressing force.

Clamping Unit and Clamping Device

With the clamping unit 1, the entire measuring head clamp-on device comprising clamping unit 1, spacing element 3, centering element 4, guide element 5 and measuring head protective housing 7 is positioned and fastened on the measuring tube 9. The clamping unit 1 is respectively disposed between the spacing element 3 and the centering element 4 and, via the connecting element, the rocker 6 is connected to the spacing element 3 and the centering element 4, and thus to the guide element 5. Said clamping unit consists of a cylindrical compression spring 11, a tension bolt 14, a tension element 15, an abutment pin 13, a clamping device 2 and the rocker 6. The fastening to the measuring tube 9 is realized fundamentally by tensioning of the clamping device 2. To this end, the clamping device 2 is inserted into the tension element 15. The tension element 15 is non-positively connected to the tension bolt 14. As a result of the tension element 15, a symmetrical tensioning of the clamping device 2 is made possible. On the tension bolt 14 is arranged the abutment pin 13, which for its part is operatively connected to the rocker 6. The abutment pin 13 is thus the connecting link between the tension bolt 14 and the rocker 6. The rocker 6 is mounted in a pivot bearing 61, so that it can swing freely. The rocker 6 ensures the division of the clamping force, introduced by the tension bolt 14, both onto the spacing element 3 and onto the centering element 4, and thus a simultaneous centering of the measuring head clamp-on device and a fulfilment of the precondition for a defined contact pressing force of the measuring heads 8. Distally to the abutment pin 13 is arranged the compression spring 11. This compression spring 11, on the one hand, presses against the clamping spring 12 and, on the other hand, acts perpendicularly to the longitudinal axis of the guide element 5 and radially to the measuring tube 9 upon the abutment pin 13. By the abutment pin 13, the tension bolt 14 is guided. At the same time, the abutment pin 13 serves as an abutment for the compression spring 11. A clamping screw 12, which is operatively connected to the compression spring 11, serves for simple pre-assembly.

Since the clamping must be realized symmetrically, both ends of the clamping device 2 are acted upon simultaneously. In order to achieve a tightest possible clasping of the tube by the clamping device, it is necessary that a sufficiently large stroke is applied to the clamping device 2. For this, the clamping unit possesses the clamping screw 12, the tension bolt 14 and the tension element 15. These parts are guided rotatably in the abutment pin 13.

For the assembly of the measuring head clamp-on device, the tension bolt 14 is actuated by pressing on the compression spring 11 and moved radially relative to the measuring tube 9. The clamping device 2 is mounted and drawn as tight as possible around the measuring tube 9. The tension bolt 14 is released and the clamping device 2 mounted in the tension element is pretensioned by the compression spring 11. By the centering element 4 with its slide bearing 43 and with the rocker 6, the measuring head clamp-on device is centered. The cylindrical compression spring 11 holds the clamping unit 1 in the upper dead center on the measuring tube 9 and pretensions the clamping device 2 after it has been mounted in the clamping apparatus 1. The clamping screw 12 facilitates handling for the toolless actuation of the clamping unit. Thus the measuring head clamp-on device is fixed to the measuring tube 9, but can still be displaced in order to achieve optimal orientation on the measuring tube 9.

As the clamping device 2, a single-row roller chain, a band clamp, or other known clamping device, for instance, is used. For the present illustrative embodiment, a single-row roller chain is chosen. The advantage of the roller chain is the high breaking load with low elongation, at the same time combined with very high flexibility. As a result of the flexibility, the roller chain can be placed easily even around small tubes, stowed away, and can be reused many times over/according to choice. As a result of the low elongation, the necessary clamping path is low, which facilitates handling.

For different tube diameters, the length of the roller chain is made variable in relation to the tube circumference and measuring head clamp-on device and fixed to the clamping unit 1. In this context, it is sensible to provide a chain end with a fixedly mounted hook (chain hook) and to guide the other chain end in a directional locking mechanism (chain lock). By means of the directional locking mechanism, the roller chain, within the scope of the chain pitch, can be brought to bear tightly against the measuring tube 9 and, by drawing of the roller chain through the directional locking mechanism, can fix this shortest possible length. After this, the remaining play of the roller chain is compensated by means of the clamping unit 1 and the measuring head clamp-on device is fixedly clamped to the measuring tube 9. For the release of the measuring head clamp-on device, the chain lock possesses a release lever, which undoes the locking of the directional locking mechanism and the roller chain is able to be withdrawn.

In order to facilitate handling of the measuring head clamp-on device, acting between the clamping screw 12 and the abutment pin 13 is the compression spring 11, by which the clamping device 2 is pretensioned. Due to the component design, it is only possible to mount the chain lock in the lower dead center, for which purpose the clamping screw 12, after the measuring head clamp-on device has been placed onto the measuring tube 9, is pressed in the direction of the measuring tube 9 and the chain lock is subsequently mounted.

Measuring Head Protective Housing

Via a guide which solely allows a radial movement, the single-part measuring head protective housing 7 is connected to the guide element 5 and is thus oriented axially relative to the measuring tube 9. The measuring head protective housing 7 receives one or two measuring heads 8, as well as the associated energy stores 81 (for example springs), and on the one hand offers impact protection for the measuring heads 8, whilst, at the same time, establishing the axial connection between the guide element 5 and the measuring head 8. The energy store 81 here acts with a defined contact pressing force between the measuring head protective housing 7 and the corresponding measuring head 8. In order to apply the contact pressing force to the measuring head 8, the measuring head protective housing 7 possesses at the ends respectively an eccentric lever 71. These eccentric levers engage in the corresponding interfaces of the guide element 5. By actuation of the eccentric levers 71, the measuring head protective housing 7 is pressed in the direction of the tube surface 91, whereby the energy store 81 is clamped and a defined contact pressing force is applied to the measuring head 8.

The invention claimed is:

1. A measuring head clamp-on device for ultrasonic flow-measuring heads, comprising a guide element for receiving at least one measuring head protective housing for at least one measuring head, at least two clamping units connected to the guide element, the at least two clamping units each including a clamping device for detachably fastening the guide element to a measuring tube, wherein the guide element is connected to at least one apparatus for centering and clamping the guide element on the measuring tube, so that the guide element is oriented and fastened parallel and with a defined distance to an apex of the measuring tube irrespective of the tube diameter, wherein the apparatus for centering and clamping the guide element comprises a centering element, a spacing element and one of the at least two clamping units, which are connected to one another via a connecting element, wherein the guide element is fixedly connected to the spacing element and the centering element is movably connected to the guide element, and wherein the connecting element is pivotably connected to the centering element and is pivotably connected to the spacing element.

2. A measuring head clamp-on device for ultrasonic flow-measuring heads, comprising a guide element for receiving at least one measuring head protective housing for at least one measuring head, at least two clamping units connected to the guide element, the at least two clamping units each including a clamping device for detachably fastening the guide element to a measuring tube, wherein the guide element is connected to at least one apparatus for centering and clamping the guide element on the measuring tube, so that the guide element is oriented and fastened parallel and with a defined distance to an apex of the measuring tube irrespective of the tube diameter, wherein the apparatus for centering and clamping the guide element comprises a centering element, a spacing element and one of the at least two clamping units, which are connected to one another via a connecting element, wherein the guide element is fixedly connected to the spacing element and the centering element is movably connected to the guide element, wherein the spacing element comprises first and second mutually parallel functional surfaces which are a predetermined distance apart, wherein the first functional surface contains a free-moving pivot joint which is arranged opposite the measuring tube and forms an interface for reception of the connecting element, and the second functional surface rests on the measuring tube, and wherein the spacing element is directly connected to the guide element by a fixed, immovable connection.

3. A measuring head clamp-on device for ultrasonic flow-measuring heads, comprising a guide element for receiving at least one measuring head protective housing for at least one measuring head, at least two clamping units connected to the guide element, the at least two clamping units each including a clamping device for detachably fastening the guide element to a measuring tube, wherein the guide element is connected to at least one apparatus for centering and clamping the guide element on the measuring tube, so that the guide element is oriented and fastened parallel and with a defined distance to an apex of the measuring tube irrespective of the tube diameter, wherein the apparatus for centering and clamping the guide element comprises a centering element, a spacing element and one of the at least two clamping units, which are connected to one another via a connecting element, wherein the guide element is fixedly connected to the spacing element and the centering element is movably connected to the guide element, wherein the centering element comprises a rectangularly shaped part and is provided at its distal end with a free-moving pivot joint which is arranged opposite the measuring tube and forms an interface for reception of the connecting element, and wherein, at an end of the centering element facing towards the measuring tube, the centering element has in a middle thereof a cutout symmetrical to the apex of the measuring tube, which cutout serves as a functional surface in order to orient the guide element parallel to a straight surface line of the measuring tube on a surface of the measuring tube.

4. The measuring head clamp-on device according to claim 3, wherein the centring element is disposed in a sliding mounting and is movable relative to the measuring tube solely in a radial direction.

5. The measuring head clamp-on device according to claim 1, wherein the connecting element is configured as a rocker, which at opposing ends rests on a respective displaceable spherical bearing, and wherein the spherical bearings are embodied as pivot joints of the spacing element and the centering element.

6. The measuring head clamp-on device according to claim 1, wherein the measuring head protective housing is connected to an energy store and the energy store is operatively connected to the guide element.

* * * * *